United States Patent
Parmley, Sr.

[11] Patent Number: 5,847,537
[45] Date of Patent: Dec. 8, 1998

[54] ELECTRIC VEHICLE CHARGING STATION SYSTEM

[76] Inventor: Daniel W. Parmley, Sr., 129 E. Citation, Tempe, Ariz. 85284

[21] Appl. No.: 740,435

[22] Filed: Oct. 19, 1996

[51] Int. Cl.⁶ .............................. H02J 7/00; E04H 6/42; E04B 1/38
[52] U.S. Cl. ................... 320/2; 52/79.9; 52/79.1
[58] Field of Search ....................... 320/2; 52/79.1–79.13

[56] References Cited

U.S. PATENT DOCUMENTS

| | | | |
|---|---|---|---|
| 3,105,929 | 10/1963 | Blue .............................................. | 320/2 |
| 4,635,412 | 1/1987 | Le Poittevin ............................. | 52/79.5 |
| 4,744,182 | 5/1988 | Shacket et al. ........................... | 52/79.8 |
| 4,854,094 | 8/1989 | Clark ........................................ | 52/79.1 |
| 4,992,669 | 2/1991 | Parmley ................................... | 290/1 R |
| 5,237,784 | 8/1993 | Ros .......................................... | 52/79.5 |
| 5,291,716 | 3/1994 | Broberg et al. ........................... | 52/79.12 |
| 5,315,227 | 5/1994 | Pierson et al. ............................... | 320/2 |
| 5,323,099 | 6/1994 | Bruni et al. ................................... | 320/2 |
| 5,402,608 | 4/1995 | Chu ........................................... | 52/79.1 |

FOREIGN PATENT DOCUMENTS 405328532  12/1993  Japan ......................................... 320/2

OTHER PUBLICATIONS

"Park 'N' Power", p. 16, Popular Science, Mar. 1992.

*Primary Examiner*—Peter S. Wong
*Assistant Examiner*—K. Shin
*Attorney, Agent, or Firm*—Gregory J. Nelson

[57] ABSTRACT

A charging station system of electric vehicles having a building which contains the charging equipment and may provide other auxiliary services. The system includes a T-bar which extends from the building to provide charging stalls or locations spaced along the T-bar. The building is modular and incorporates a standard ISO type configuration for ease and convenience of installation and transportation.

18 Claims, 4 Drawing Sheets

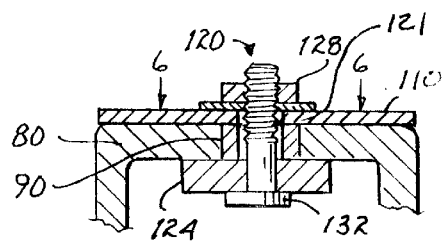
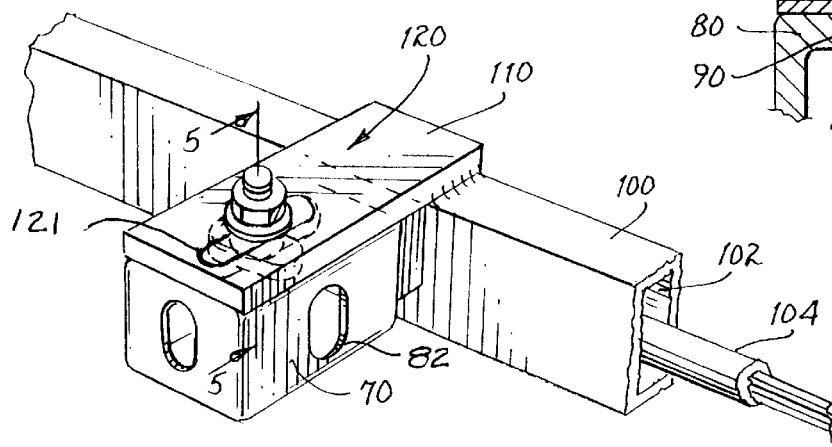
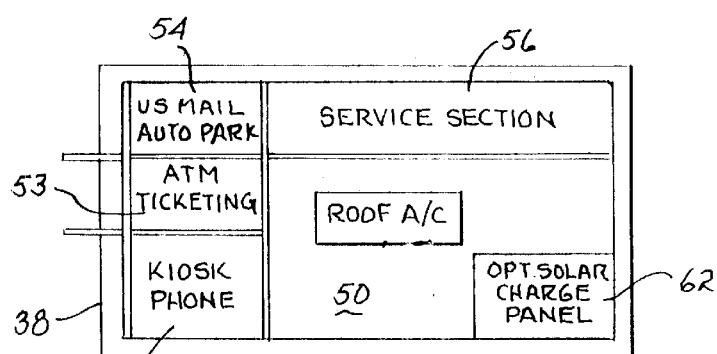
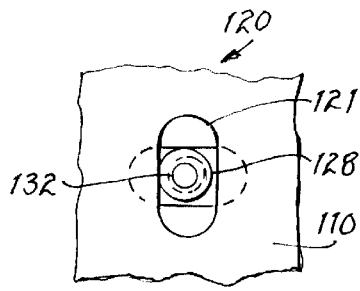
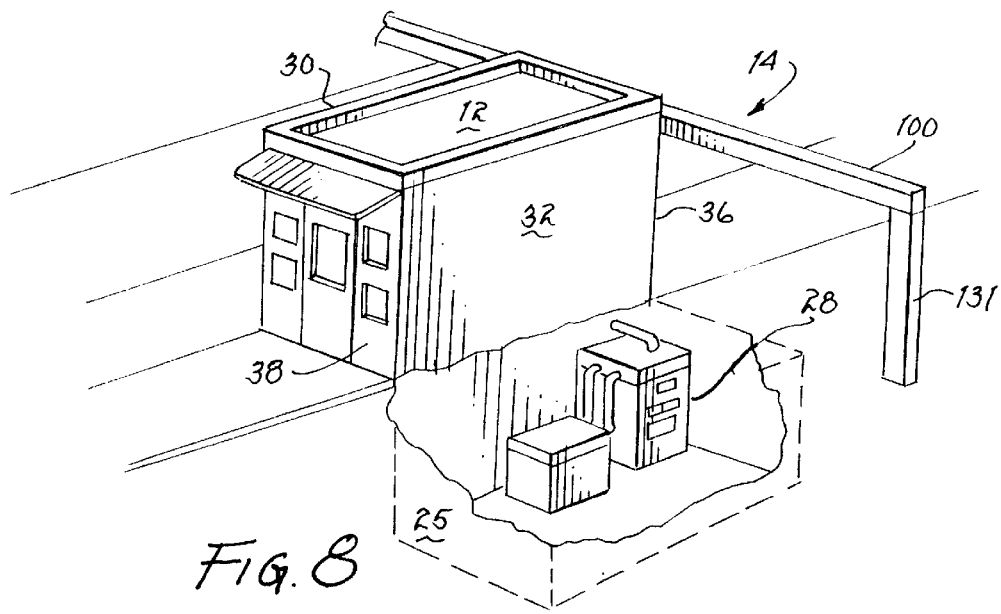

ELECTRIC VEHICLE CHARGING STATION SYSTEM

BACKGROUND OF THE INVENTION

This invention relates to battery-powered vehicles, and more specifically relates to a modular system for charging electric vehicles and providing other convenient services which may be utilized while users are waiting for their vehicles to be charged.

DESCRIPTION OF THE RELATED ART

Electric vehicles have been available for many years, but their use has been primarily limited to special applications such as industrial vehicles, certain types of trucks used in the mining industry and recreational vehicles, such as golf carts. However, recently due to environmental considerations and technological developments and advancements in the area of batteries, electric vehicles are gaining wider acceptance. In fact, states such as California and New York have adopted legislative mandates requiring that at least two percent (2%) of new vehicles in those states must be electric powered by the year 1999.

Electric vehicles have a number of advantages including high efficiency, about three times that of conventional combustion engine powered vehicles. Electric vehicles are also quieter and do not discharge exhaust fumes. The biggest drawback of electric vehicles is their limited range. Today, commercially produced electric vehicles such as the GM EV-1, manufactured by General Motors Corporation and available at selected Saturn dealers, has a range of approximately 80–120 miles between charges. Statistics indicate that at least 40% of the drivers do not drive more than 40 miles a day. For many drivers, this range is sufficient and the vehicle batteries can be recharged at the driver's residence or at a service location over night before the vehicle is driven again. However, for longer trips, limited range is a serious disadvantage rendering electric vehicles unsuitable for many drivers.

One approach to extending the operational range of battery powered vehicles is to provide stations or locations at which the replacement of the battery pack which powers the vehicle can be accomplished. However, installation or removal of a battery pack from a battery powered vehicle and from a battery charging device may be dangerous, exposing personnel to possible electrical shock and other hazards such as exposure to chemicals and potential explosions. In addition to the above-mentioned hazards, replacing battery packs is a difficult job as the battery packs typically weigh 1,500# or more. Heavy equipment is normally required to allow the operator to remove the battery pack from the vehicle, transfer it to a charging location or replace the removed battery pack with a new battery.

Various systems to facilitate such transfer are available such as those systems shown in my prior patents, U.S. Pat. Nos. 5,452,983, 4,504,991 and 5,508,597. The '597 patent is representative of the state-of-the-art and shows an apparatus for storing charging batteries which facilitates quick exchange of battery apparatus for battery powered vehicles. While battery exchange systems, such as those described, are useful and do serve to extend the effective range of electric vehicles, there nevertheless exists the need for charging in service stations which may be utilized by the operators of electrical vehicles for charging electric vehicle batteries.

Currently, some electric vehicle charging stations are available and generally are single plug devices having a system for metering time or power and for billing the customers. Single meter systems are expensive both in the first cost of installation as well as in operation. Conduits and conductors that supply power to the power metering unit usually extend underground in trenches which increases expense and also increases potential hazards. These types of installations do not lend themselves to convenient expansion as expansion generally requires additional trenching.

Another problem with current methods of charging electrical vehicles at charging stations is that the connector cables connecting the charging device to the vehicle are often exposed and difficult to handle.

A further problem with conventional charging stations is that plug-in locations are often outdoors, exposed to the elements. Weather conditions, such as rain or snow, can impede the proper and safe operation of such electrical systems which operate at high power levels.

The buildings or housings associated with conventional charging stations are constructed in a manner such that they are not convenient to install and to relocate in the event of a change of location becomes necessary. The cost to build these structures, which are generally permanent structures, is high and most contemporary charging stations are single function units providing only charging services.

Briefly, the present invention provides a modular charging station for charging the batteries of electric vehicles while also providing the operator other conveniences and services.

SUMMARY OF THE INVENTION

Briefly, the present invention relates to a charging station system which includes a structure, such as a modular building, which houses the main components necessary to charge batteries of electric vehicles, electric boats and other types of battery-powered devices. The building may also serve as a location for dispensing other services such as banking services, communication services, ticket purchases, mail services and the like. The system includes a pre-fabricated, modular building and a unique T-bar system so that it may be installed and made operational in a short period of time. The system has the capability of expansion so that additional charging spaces may be added without the necessity of underground trenching.

The modular building which houses the system components utilizes the configuration of a basic ISO shipping container incorporating a T-bar and may be removably coupled to the building so that it extends outwardly from the housing. The overhead T-bar provides a location for installation of electrical conduits extending from the building to drop down at charging locations or spaces located along the T-bar. The T-bar also serves as a location for attachment of a protective canopy, the upper surface of which provides a convenient location for solar panels for providing electrical power for the building and for operating the various service functions. The building is also provided with ISO connectors at the four corners along the bottom which serve as standardized positioning locations so the unit may easily be secured while in transit and also provide location for attachment points for positioning the building at the site location. ISO connectors are provided at the four corner locations at the top edge of the building and serve as attachment locations for removably securing the T-bar. The ISO connectors also allow for convenient transportation and installation in that the building can be lifted, stacked and interconnected at these locations.

BRIEF DESCRIPTION OF THE DRAWINGS

The above objects and advantages of the present invention will be more appreciated and understood from the following description, claims and drawings in which:

FIG. 4 is a detailed perspective view of the T-bar secured to an ISO connector block;

FIG. 5 is a sectional view taken along line 5—5 of FIG. 4 showing details of the connection between the T-bar and the ISO connector;

FIG. 6 is a top view of a T-bar and ISO connector illustrating the twist-type fastening device for releasably securing these components together;

FIG. 7 is a top view of the building which is partitioned into a typical arrangement for providing various services available at the station;

FIG. 8 is a perspective view of a charging station, including an adjacent below-grade excavation in which equipment such as fast charging equipment may be located;

DETAILED DESCRIPTION OF THE DRAWINGS

Figure 1:
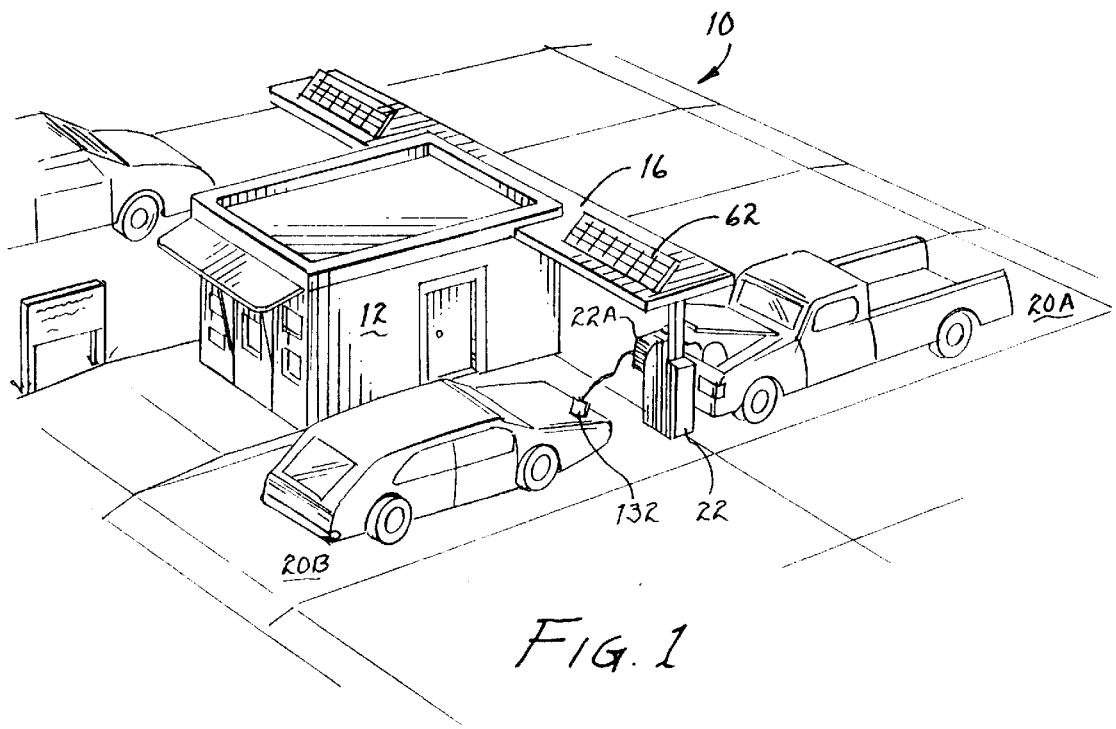
FIG. 1 is a perspective view of the modular electric charging station of the present invention showing several vehicles in charging spaces connected to battery chargers.

Turning now to the drawings, FIGS. 1 to 8 illustrate the charging station system of the present invention. The charging station system of the present invention provides substantial advantages in that it allows vehicle operators to safely and conveniently re-charge batteries while providing other services which the operators may utilize while charging occurs, allowing the operators to make optimum use of their time during charging. Also the present invention provides an improved modular building that can be installed quickly and efficiently due to a standardization system that incorporates a design similar to the ISO shipping container concept. The present invention also provides a standardized T-bar, a device that conveniently attaches to the top perimeter of the building and can be quickly and easily installed and allows disassembly, if necessary. The system also allows the charging station to be expanded as required. Generally, the charging station system of the present invention will be used primarily for charging electric motor vehicles and would be located at convenient intervals along highway systems. Of course, stations can also be provided elsewhere such as at malls, marinas, and industrial areas, for convenience of charging both vehicles and other electrically powered equipment.

The charging station system is generally designated by the numeral 10 and includes a modular structure such a building 12, to which is attached a T-bar assembly 14. The T-bar assembly 14 supports a canopy or roof 16, and a plurality of spaces or lanes, 20A, 20B, etc., are provided for vehicles so that they may be parked at a location beneath the canopy and adjacent to one of the charging devices, 22, 22A, etc. As seen in FIG. 8, the building 12 may be positioned adjacent or above an excavation 25, which excavation 25 serves as an equipment area for equipment such as fast charging unit 28. Charging unit 28 may be a fast charging unit of the type manufactured by Norvik. Fast charging, because of the high power demands of the fast charging unit on the local power system, would necessarily require the user to pay a higher charging fee and also its utilization might be limited to certain time periods. The high power charging unit 28 is controlled by a low voltage switch on device 22. Power plug 132 supplies charging current from medium powered charger 22A. Unit 22 is representative of conductive charging units such as those manufactured by EVI and unit 22A is representative of inductive charging units such as those manufactured by GM-Hughes.

Figure 12:
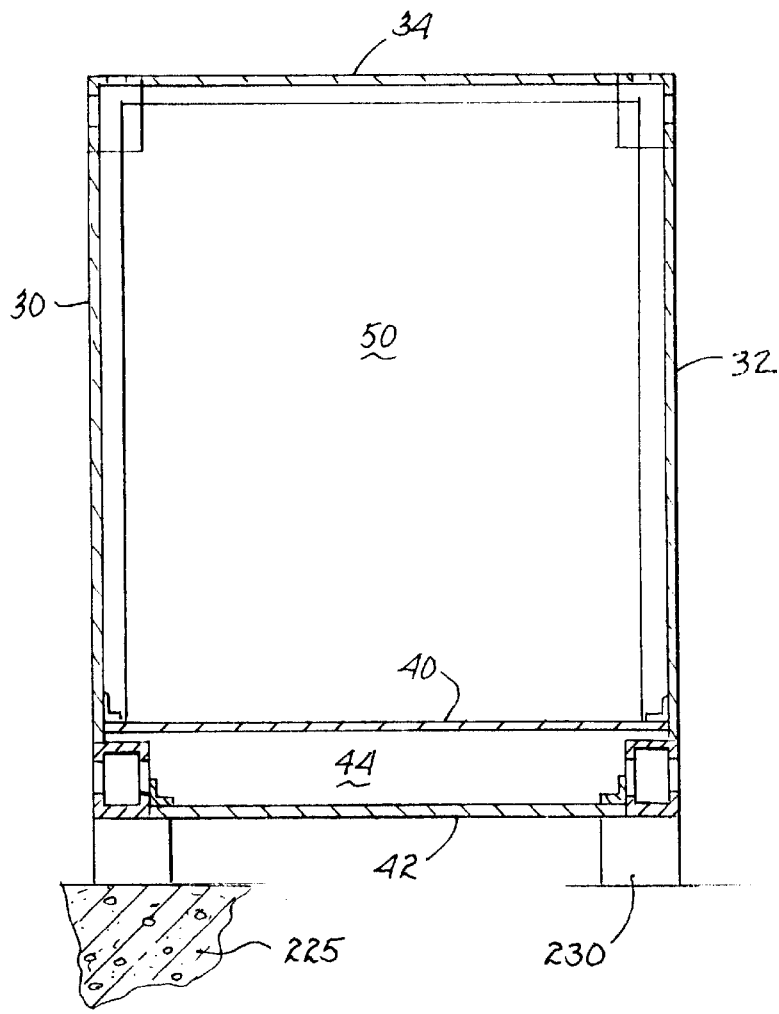
FIG. 12 is an end view partly in cross-section of the installed building showing the access area for installation of electrical wiring, conduit and piping to interior/exterior components.

Charging station building 12, is of a modular, preferably prefabricated, construction and is shown being generally rectangular and having side walls 30, 32, generally flat roof 34, rear wall 36, and a front wall 38. As seen in FIG. 12, the modular building has a floor 40 with removable sections and a subfloor 42 spaced above the floor 40 to provide an access area 44 through which appropriate mechanical and electrical conduits can be run. The building may be constructed of any suitable material, but preferably fabricated using conventional mental fabrication techniques with exterior walls being sheet metal, of sufficient thickness to provide strength and security. The building preferably has standardized dimensions, such as those of a sea cargo container, for ease of transportation. The exterior of the building may be appropriately painted or coated for both decorative appeal and durability.

The interior area 50 of the building provides space for electrical charging equipment or the charging equipment may be located in an adjacent excavated equipment room as shown in FIG. 8. Interior space 50 also provides a location for various other convenience and auxiliary services which may be dispensed so that the user may take advantage of these services while charging a vehicle. Normally, the charging time for a vehicle using conventional charging rates is about three to six hours and rapid charging requires five to ten minutes. Accordingly, as seen in FIG. 7, building internal space 50 is subdivided or partitioned into areas such as communication area 52, which may include one or more telephones. The area at the front 38 of the building, provides automated services such as banking services and ticketing services. A mail drop 54 may also be provided. It would be obvious that other convenience services may also be provided within the building. It is preferred that the services be automated, not requiring the full time attendance of clerks or attendants. The building area 50 also includes a service area 56 for providing a location for the various electrical, mechanical support systems for the charging station and also for supporting the various auxiliary services provided. The services may be serviced with electrical, mechanical support systems for the charging station and also for supporting the various auxiliary services provided. The services may be serviced with electrical power which may be supplemented by one or more solar panels 62, which are shown on the roof of the building, or may also be positioned in various arrays along the top surface of the canopy 16 so as to expose the solar panel 62 to maximum solar radiation. Other mechanical and electrical components may also be placed either within the service section 56 or on the roof of the building 12.

Figure 2:
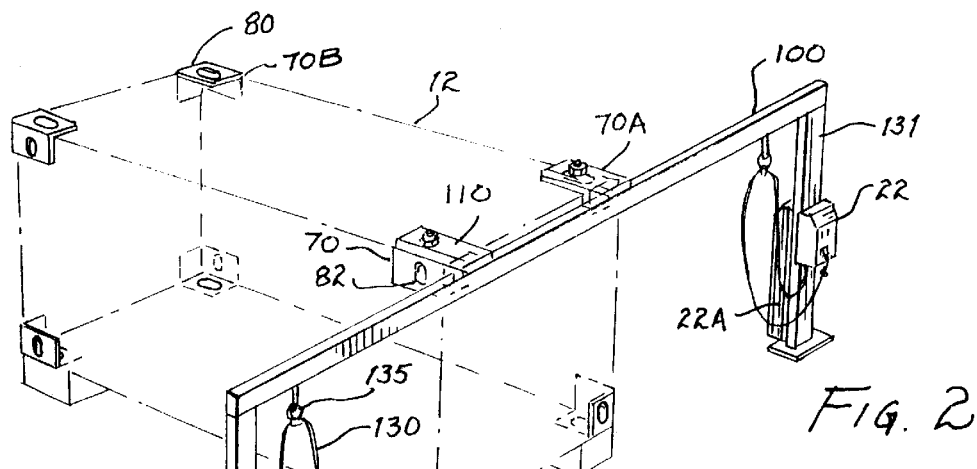
FIG. 2 is a perspective view showing the modular building and T-bar support assembly with the building being shown in dotted lines and the ISO connectors, T-bar and charging stations being shown in solid lines.
Figure 3:
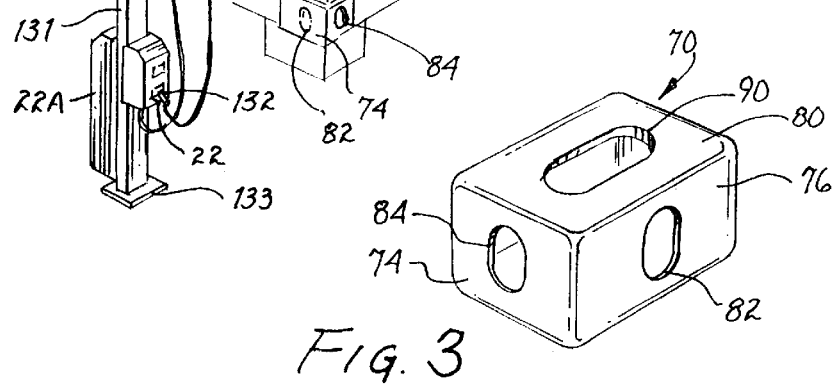
FIG. 3 is a perspective view of one of the ISO connectors associated with the building for transporting and installing the system and for attaching the T-bar and other components to the building.

The building 12 is provided with a plurality of ISO connectors 70, 70A, 70B, etc. with one of such connectors located at each of the eight corners of the building. The term "ISO" connector refers to the type of connector described in International Standards Organization, Handbook No. 34. The ISO connectors are best shown in FIG. 3 and have end 74, side 76, and top 80. Elongated, general oval openings 82 and 84 are generally vertically disposed in the sides 82 and 84. An elongated oval opening 90 is provided in the top surface 80. The ISO connectors 70, 70A, 70B, etc. are disposed at each of the eight corners of the building as best seen in FIG. 2. The ISO connectors facilitate loading and unloading, lifting and lowering of the building, and allow the building to be attached to or stacked with similar structures.

The connectors also facilitate attachment of the T-bar 14. Referring to FIGS. 4, 5, and 6, the T-bar structure includes a generally horizontally-extending box channel 100, which defines internal passageway 102 through which appropriate mechanical or electrical conduit, such as electrical conduit 104, may pass connecting the charging devices 22, to a power source. A pair of spaced-apart mounting plates 110 are welded to the T-bar and extend from the upper surface of the T-bar at locations corresponding to the spacing between the ISO connectors located at the top corners of the building. The plates 110 are in position to register or align with the top surface 80 of the ISO connectors. The mounting plates 110 have oval inserts 121 welded to it that register with the opening 90, 90A in the top surface of the associated connector. The inserts define above 119. When aligned in this manner, a twist lock assembly 120, as best seen in FIGS. 5 and 6 may be inserted through the aligned openings 119 and 90. The twist lock assembly includes a bolt 132 which has an oval washer or swivel 124 attached to its head end. The oval washer is dimensioned so that it may be passed through opening 90 in block 74. Once in position, the oval washer 124 is rotated 90° to the position shown in FIG. 6 and the assembly is completed by tightening nut 128 on bolt 132. The fastener assembly secures the mounting plate and T-bar to the ISO connector. This assembly method is quick and convenient. Access to the twist lock assembly is thorough opening 82 in the side of the connector.

The T-bar may extend laterally from the building as desired to provide the requisite number of charging spaces, 22, 22A. Vertical posts 131 are provided at locations depending from the T-bar at the various charging lanes or spaces. The posts 131 may be secured in the ground or may be mounted on appropriate pads 133. As indicated above, posts 131 carry charging stations 22, 22A which are of the type previously described and which may be operated by insertion of a credit card into the automated pay parking device located at the building. Once payment is made, a low voltage circuit is completed to relay in the charging device 22, 22A which are of the type previously described and which may be operated by insertion of a credit card into the automated pay parking device located at the building. Once payment is made, a low voltage circuit is completed to relay in the charging devices 22, 22A which, in turn, energizes the charging device. The charging device includes a cable 130 which is preferably mounted on a retractor 135 so that it may be rewound after each use so that loose, dangerous cable is not left in the area when not in use. The cable 130 has a head 132 connectable to the recharging post or port on the vehicle.

For example, the current commercial version of the EV-1 requires a paddle to be inserted into the charging port and has an inductive charging system which avoids metal-to-metal contact. Alternatively, conductive charging can be provided with suitable connectors or clamps connectable to the charging post.

Figure 13:
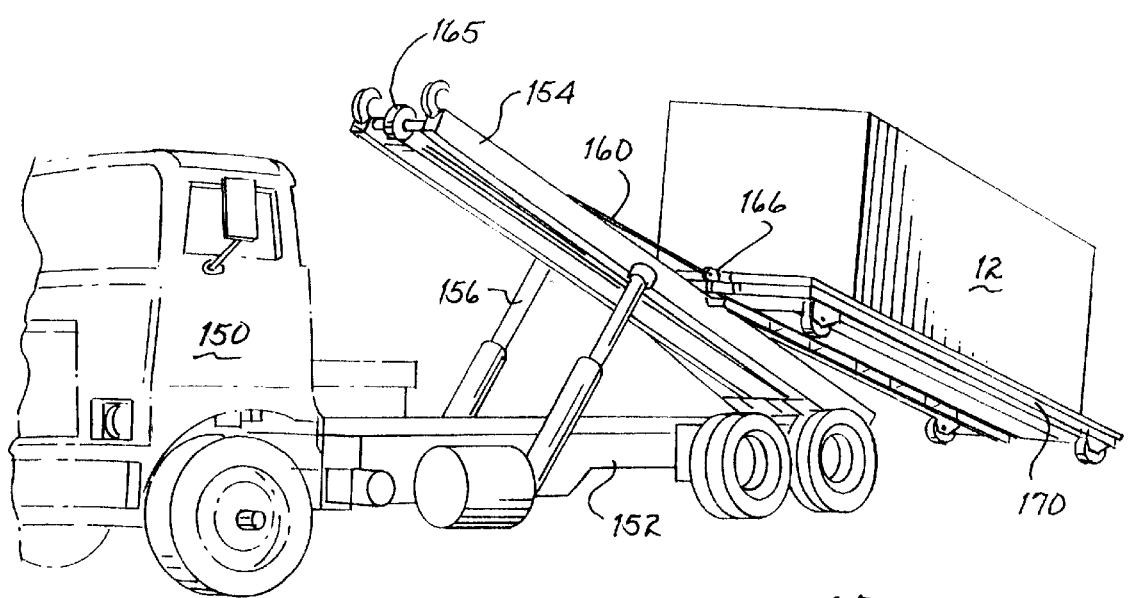
FIG. 13 is a perspective view showing the specially designed platform and loaded building being discharged from a roll-off tractor used for transporting the building.

To facilitate the transportation of loading/unloading of the building, a roll-off truck 150, such as that shown in FIG. 13, may be utilized. The truck 150 includes a rearwardly extending chassis 152, which supports a roll-off ramp 154 which is pivotally attached tot he rear of the chassis. The roll-off ramp may be elevated or lowered by means of hydraulic rams 156. The ramp is equipped with a power winch, not shown, to which a cable 160 is attached. The cable extends along the underside of the platform and over cable pulley 165. The end of the cable carries a C-hook or other attachment means 166 which is securable to platform 170 on which the building is temporarily secured during transit.

Figure 9:
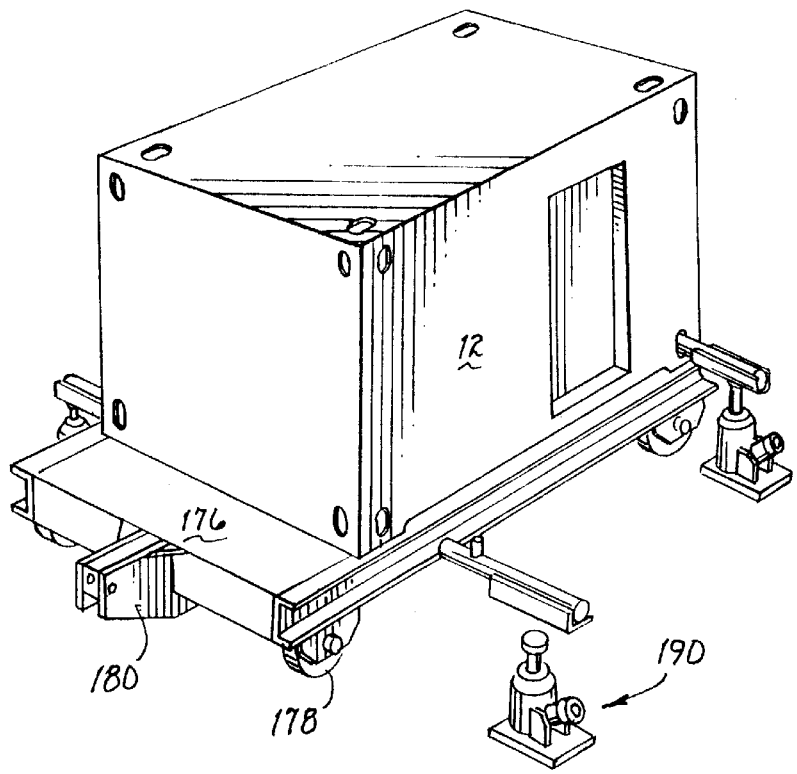
FIG. 9 is a perspective view of a building shown positioned on a specially designed transfer and lifting platform for loading and unloading the building'
Figure 10:
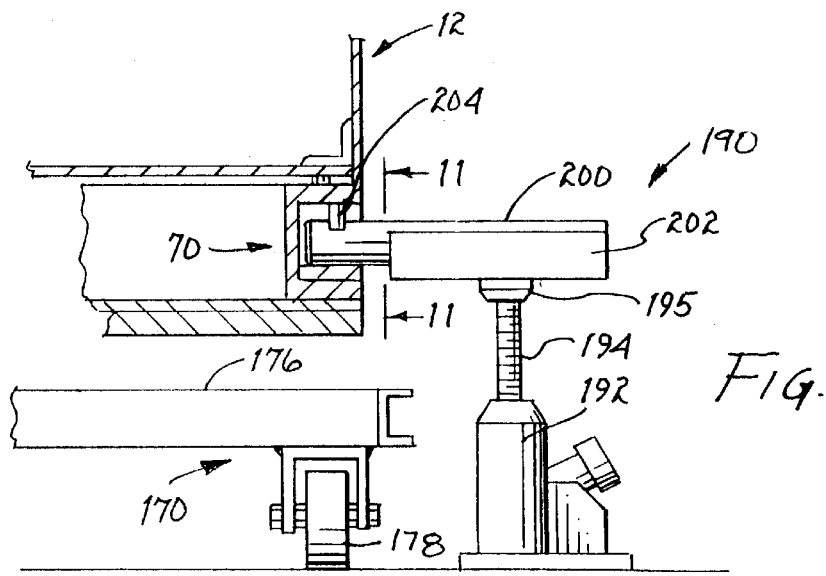
FIG. 10 is a view, partly in section, showing a lifting jack for elevating the building from the transport platform, and lowering it onto a support or footing at the site location.

The platform is best seen in FIGS. 9 and 10 as a generally plannar load-carrying surface 176 and is supported on a plurality of heavy duty wheels or casters 178 located at the four corners of the generally rectangular load-carrying surface. The platform may be constructed from a suitable material such as beams or channels welded together to form a frame and covered by heavy steel plates. A hitch 180 is provided at the forward end of the platform for attachment to the winch cable as discussed above.

Figure 11:
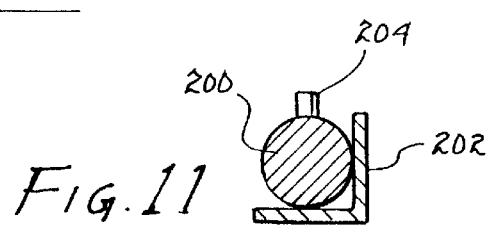
FIG. 11 is a sectional view taken along line 11—11 of FIG. 10 showing the lift pin which is insertable into the ISO connector to raise the building from the transport platform.

Once the building 12 is unloaded from the roll-off truck, the platform may be disengaged from the cable winch and the platform 170, carrying the building 12, moved to the installation site. Once at the installation site, the housing is elevated so that the platform 170 may be removed and the housing subsequently lowered to the installation location. To accommodate this, a jack system, as best seen in FIGS. 10 and 11, is provided. The jack system 190 includes a jack 192 which may be manually or hydraulically actuated to extend lead screw 194. The upper end of the lead screw carries a swivel 195 to which is attached a lift bar 200. The lift bar includes an angle section 202 which is welded or otherwise secured to the lift bar 200 at the upper end of the lead screw. The outer end of the lift bar 200 carries an upwardly projecting spacer pin 204.

To elevate the housing from the platform 170, a plurality of jacks 190 are provided, four being shown, located adjacent the corners of the building with the lift bar perpendicular to the holes 82 in the sides of the ISO connectors. The lift bars are inserted in their respective ISO connectors with the pin 204 engaging the container. The jacks may then be actuated to extend the lead screw to lift the platform to the position seen in FIG. 10, at which point the platform may be removed from beneath the building. The site has been prepared by installing footings 225 and concrete bearing blocks or beams 230 which are positioned beneath the building and the building is then lowered by means of the jacks to one position shown in FIG. 12.

It will be seen from the foregoing that the present invention provides a convenient and safe charging station system for electric vehicles. The system of the present invention allows the vehicle operator access to other personal services such as banking, communication, ticket purchases, information and the like, at the same location while awaiting completion of charging. The present invention also provides an improved prefabricated building system that can be installed in a short period of time due to standardization of the system which incorporates a construction utilizing ISO shipping container concepts.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A modular battery charging station for charging the batteries of battery-powered vehicles comprising:

(a) a building having a side wall, a top wall and a bottom wall;

(b) connector means on said building located at an elevation above the bottom wall of the building;

(c) a structural bar member extending outwardly from said building and detachably secured to said connector means and defining multiple charging stations therealong; and (d) charging devices located at said charging spaces disposed subjacent said structural bar member and being electrically connected to said building via said structural member.

2. The battery charging station of claim 1 wherein said connector means comprise an ISO connector having at least three sides, each defining a slot therein.

3. The battery charging station of claim 1 wherein said building is a generally rectangular modular building having corners and wherein said ISO connectors are located at the upper corners of said building.

4. The battery charging station of claim 2 wherein said structural bar member is a generally channel-like member having at least one mounting plate extending therefrom engageable in said ISO connector and securable by twist-lock fastener means.

5. The battery charging station of claim 1 wherein said building includes an area for electrical equipment connectable to said charging station and further includes areas for other vehicle operator services.

6. The battery charging station of claim 1 further including a canopy generally horizontally disposed on said structural bar member.

7. The battery charging station of claim 6 further including solar panel means disposed on one of said canopy and building roofs and power circuit means connected to said solar panel for providing supplemental power to the building.

8. The battery charging station of claim 1 further including an excavation disposed adjacent said building and providing an equipment room area.

9. The battery charging station of claim 1 wherein said charging devices include both regular and quick-charging devices.

10. The battery charging station of claim 1 wherein said charging devices include both inductive and direct conductive charging means and wherein at least selected of said charging devices are operable by insertion of a credit card, coins or currency.

11. The battery charging station of claim 10 wherein said charging devices are connected to power relays in said building by means of a low-voltage control circuit.

12. A method of providing a charging station comprising:

(a) providing a selected site;

(b) providing a building containing electrical support components to connect to a power supply system;

(c) constructing a building at a remote location and placing the building on a roll-off transport device;

(d) transferring the building to the site;

(e) unloading the building at the site;

(f) detachably securing a structural bar member to the building at an elevation above the ground at connector means and supporting said structural bar member at vertical posts at selected locations spaced from said building to define a plurality of charging locations;

(g) positioning charging devices at said charging locations along said structural bar member; and (h) connecting said charging devices to said electrical components via said structural member.

13. The method of claim 12 further providing said building with additional convenience services.

14. The method of claim 12 wherein said building is transferred to the building site by placing it on a platform having roller means and rolling said platform onto a transfer vehicle and rolling said building and platform off of said transfer vehicle at said site.

15. The method of claim 14 further including the step of elevating said building above of said platform at said site and removing said platform and thereafter lowering said building onto the site by means of a jack.

16. The method of claim 15 wherein said building is provided with ISO connectors at selected locations and wherein said structural member is a channel member having projections releasably engageable with said channel member.

17. The method of claim 16 wherein said charging devices are connected to said building by electrical conduit via said channel members.

18. The method of claim 17 wherein said charging devices are connected by a low voltage circuit to a power relay located in said building.

* * * * *